Patented Nov. 20, 1951

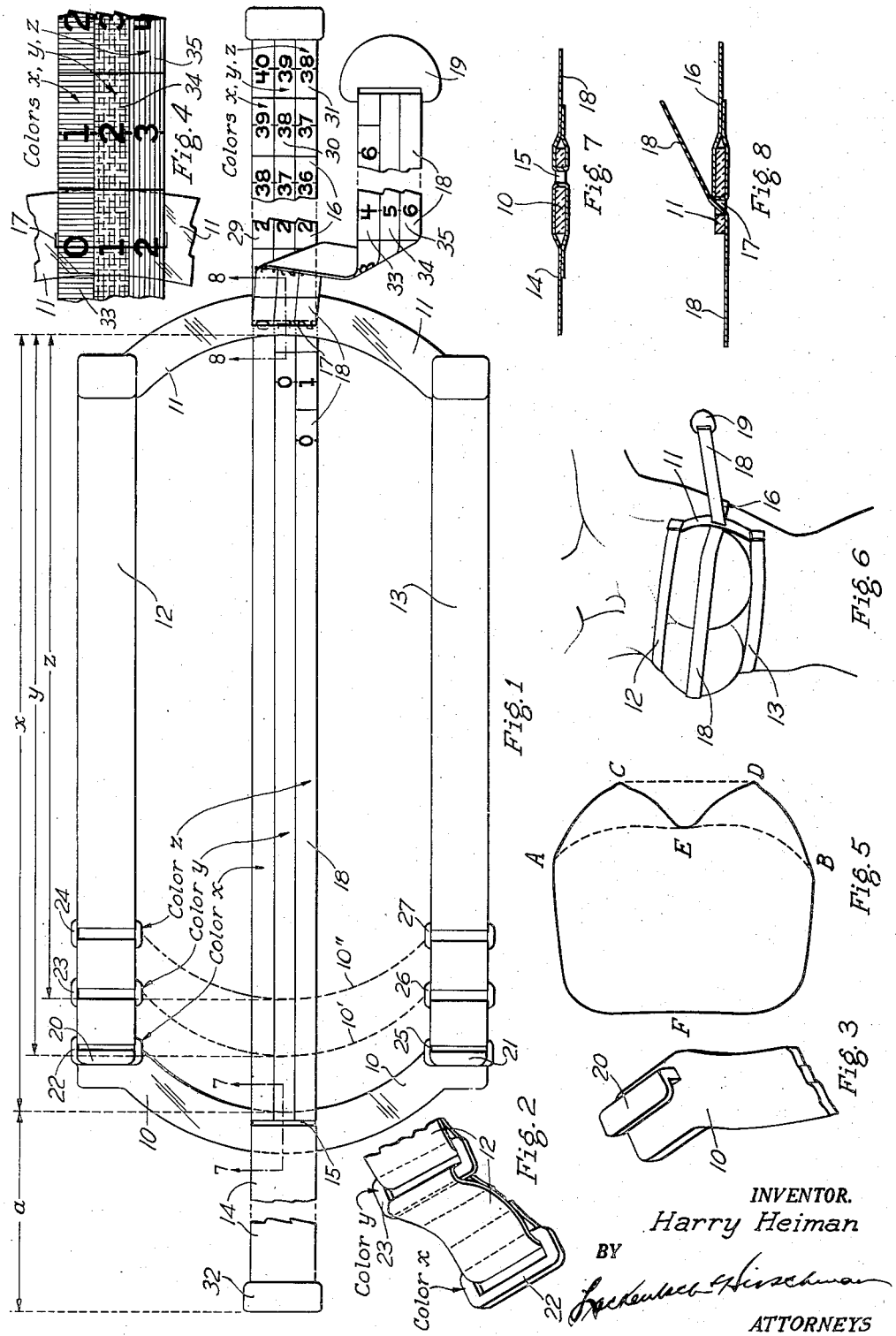

2,575,343

UNITED STATES PATENT OFFICE 2,575,343

BUST-MEASURING DEVICE

Harry Heiman, New York, N. Y., assignor of one-half to Henry M. Plehn, New York, N. Y.

Application July 8, 1948, Serial No. 37,598

10 Claims. (Cl. 33—2)

The present invention relates to devices for taking chest and bust measurements, and, in particular, to devices for taking such measurements for the purpose of facilitating the fitting of brassières and the like; and the general object of the invention is to provide a novel, simple, inexpensive, and practical device of this class.

It has been the general practice in the brassière trade to identify the various sizes of brassières in terms of the circumferential measure around the thorax at the level of the nipples of the breasts and of the capacity of the cups of the garment. The identification of size has been, heretofore, a figure representing the circumferential measure in inches and an arbitrary letter representing the cup size. While this system of identifying size is in general use it is well known that the cup-size symbols are not standardized, and that one manufacturer's symbol may relate to a cup size slightly different from that identified by the same symbol on another manufacturer's product.

It is manifest that the measurements requisite to the proper fitting of a brassière are the actual chest measurement exclusive of the increment relating to the protuberant breasts, and the increment itself; for with such information the proper length of band and the proper cup size, this latter calibrated in terms of such increment, may readily be selected.

Thus the present invention contemplates a device for quickly and simply ascertaining both the actual basic chest measure exclusive of said increment, and the increment itself, so that the fitter may know the required band length and the amount of mammary protuberance required to be accommodated by the cups. In consequence, the invention contemplates a device for accurately obtaining such measurements whereby the proper selection of brassières may be greatly facilitated by the use of the device in connection with the employment of a size-marking system which translates the two measurements referred to above.

In the drawing:

Fig. 1 is a plan view of the device, partly erased, as explained below, for the purpose of reducing the figure.

Fig. 2 is an enlarged perspective detail of the lefthand end of the uppermost strap seen in Fig. 1.

Fig. 3 is an enlarged perspective detail of the upper part of the lefthand yoke seen in Fig. 1.

Fig. 4 is an enlarged fragmentary plan view of one of the measuring tapes of the device.

Fig. 5 is an outline horizontal section of a female human thorax.

Fig. 6 is a fragmentary perspective view of a female human thorax showing the device in use.

Fig. 7 is the section 7—7 of Fig. 1.

Fig. 8 is the section 8—8 of Fig. 1.

The device comprises, as shown in Fig. 1, two yokes 10 and 11, preferably of transparent plastic; two straps 12 and 13 connecting the yokes; an interrupted tape measure having one part 14 attached to the center of yoke 10 through a slot 15, and another part 16 connected to the center of yoke 11 through a slot 17; and an auxiliary tape measure 18 connected at one end to the center of yoke 10 through slot 15 and passed through slot 17 of yoke 11 and having a tab 19 on its other end sufficiently large to be incapable of passing through slot 17.

The straps 12 and 13 are both permanently attached at one end to yoke 11, as shown, and removably attached at the other end to yoke 10. Each strap comprises a chain composed alternately of strips of tape, preferably fabric, and of rigid links. The righthand portion of either strap is a strip of tape considerably longer than all other portions of the tape combined, while the other two tape portions of the strap are of equal length, such length being but a small fraction of that of the righthand portion. The straps may be removably attached to yoke 10 by placing one link of each strap over one of two hooked lugs 20 and 21 provided at the extremities of the yoke. The links of strap 12 are indexed 22, 23, and 24; those of strap 13 are indexed 25, 26, and 27. Each link (see Fig. 2) is preferably a lozenge-shaped element having a central longitudinal slot 28 to accommodate tape forming part of the strap and also to accommodate the hooked lug of yoke 10 relating to the strap. The construction of the straps adopted for the purposes of illustration will be readily understood to be one that permits of ready variation of the effective length of the straps. In Fig. 1 links 22 and 25 are shown engaging lugs 20 and 21, and the maximum available separation of the yokes 10 and 11 obtains. This maximum separation is dimensioned $x$. If links 23 and 26, instead of links 22 and 25, are placed over lugs 20 and 21 respectively, the separation of the yokes is decreased by the length of one of the smaller tape portions of the straps; and if lugs 24 and 27 are similarly used, the separation of the yokes is further decreased by the same length. The intermediate separation of the yokes is dimensioned $y$ and the minimum separation $z$.

The positions of the yokes with respect to the breasts during a measuring operation is clearly illustrated in Fig. 6, a fragmentary perspective view of a female human thorax: here it is obvious that the separation between the yokes is desired to be substantially equal to the distance from the outer side of one breast to the outer side of the other of the person being measured. Thus if the longer tape portion of each strap is thirteen inches in length and the shorter tape portions each of such length that, the width of the slots 28 of the links being considered, each provides an additional inch of length to the long tape portion, the separation of the yokes with the straps stretched tightly may be varied in one inch steps from thirteen to fifteen inches—a range suitable for a great number of women.

Fig. 6 also clearly shows the purpose of employing the two straps. The straps, together with the yokes and the parts 14 and 16 of the interrupted tape measure, actually constitute the equivalent of a tape measure having a bifurcated portion, so that the breasts are bypassed above and below in the measuring operation and so that the figures of part 16 read in terms of the axial chest measure at the level of the nipples of the breasts exclusive of the increment relating to the protuberance of the breasts.

Neither part 14 nor part 16 of the interrupted tape measure is provided with means for varying its effective length, except that part 16 is provided with three separate scales 29, 30, and 31, as seen in Fig. 1. Scale 29 is calibrated to read in terms of the chest measure (against an end marker 32 of part 14) when the device is used with the yokes at their greatest separation; scale 30 to read in such terms when the device is used with the yokes at intermediate separation; and scale 31 to read in such terms when the device is used with the yokes at their least separation. If the maximum available separation is fifteen inches, the intermediate fourteen inches, and the least thirteen inches, and the effective length of part 14 nine inches, the figures of scale 29 should be arranged, as shown in Fig. 1, to compensate for twenty-four inches from the marker 32 of part 14 to the inside edge of yoke 11; likewise, the figures of scale 30 should be arranged, as shown, to compensate for twenty-three inches from the marker to the yoke 11, and the figures of scale 31 should be arranged, as shown, to compensate for twenty-two inches from the marker to yoke 11. Thus the scales should be staggered, and, in Fig. 1, they are shown to be.

As a convenience it is suggested that a color code be used as a ready visual index of the relationships between certain pairs of strap links and the three scales of part 16. The three settings of the straps are those having dimensions $x$, $y$, and $z$. The color red, for example, may be selected to represent the dimension $x$, yellow the dimension $y$, and blue the dimension $z$. Accordingly, links 22 and 25 and scale 29 may be red (color $x$, Fig. 1), links 23 and 26 and scale 30 yellow (color $y$), and links 24 and 27 and scale 31 blue (color $z$).

The auxiliary tape measure 18, one of which is attached to yoke 10 and which passes through slot 17 of yoke 11, is also provided with three separate scales 33, 34, and 35. These scales are staggered like scales 29, 30, and 31. See a fragmentary plan view of measure 18 in Fig. 4 wherein color code has been entered upon the drawing to show that the background of scale 33 is red, of scale 34 yellow, and of scale 35 blue (colors $x$, $y$, and $z$, respectively; see Fig. 1). The zero mark of scale 33 is seen to be aligned with the lefthand edge of slot 17 of yoke 11 (cf. Figs. 1 and 4) where links 22 and 25 are employed in the setting of the straps, as in this figure. Accordingly, the zero mark of scale 34 is advanced with respect to that of scale 33 so that the one-inch mark of scale 34 is aligned with the zero mark of scale 33; and the zero mark of scale 35 is advanced with respect to that of scale 34 so that the two-inch mark of scale 35 is aligned with the zero mark of scale 33.

In using the device to make bust measurements, as illustrated in Fig. 6, the device is fitted around the body with the straps above and below the breasts, and the measure 18 is then tightened across the breasts so that a reading may be taken on the appropriate scale at the lefthand edge of slot 17. With reference now to Fig. 5, an outline horizontal section through the thorax at the level of the nipples of the breasts, the measure of which part 16 is the scaled portion, gives the distance from A through E (roughly the front of the sternum bone), B, and F (the spine) back to A. A and B represent points of the circumferential measure at the beginning of the lateral mammary structure superposed on the chest itself: in other words, A and B represent the positions of the yokes (see Fig. 6). The auxiliary measure 18 indicates not the length of the path from A through C (left nipple) and D (right nipple) to B, but the increment by which the measure around the thorax at and over the nipples exceeds the actual chest measure at that level. The dotted line AEB, Fig. 5, indicates the average path of the straps. While the auxiliary measure follows a straight line (dotted) from C to D and does not touch at E (before the sternum), it has been found that the index of increment so found is sufficient for all practical purposes in designing brassière cups—the usual slight difference in size of the breasts of a pair being immaterial.

Figs. 2, 7, and 8 clearly illustrate simple means whereby the tape portions of the device may be secured to other portions through the several slots. In these figures an end of each tape portion shown is seen to be looped back upon itself so that it may so be secured in any suitable manner, as by sewing.

I claim:

1. A bust measuring device comprising two measuring straps and a pair of yokes connecting their ends and constituting a frame, said frame being adapted to surround the bust and to lie against the surface of the chest proper and an interrupted tape measure secured on both sides of said frame whereby the girth of the chest exclusive of the protuberance of the breasts may be measured, and an auxiliary measuring tape attached to one of said yokes whereby the distance from said yoke to the other yoke may be measured over the breasts at the level of the nipples to derive an index of the amount of said protuberance.

2. A bust measuring device according to claim 1 wherein one portion of said interrupted tape measure is marked ordinally in units of length each mark representing the distance from that mark through said frame to the far end of the other portion of said interrupted tape measure; and wherein the auxiliary measuring tape is marked ordinally in units of length the zero mark thereof coinciding with that side of said frame to which said auxiliary tape measure is not attached when said auxiliary tape measure is stretched across said frame in plane therewith.

3. A bust measuring device comprising a measuring strip bifurcated at one portion so as to bypass the breasts above and below in measuring the girth of the chest, a yoke forming the connection for said bifurcated portion and an auxiliary measuring tape attached to said strip at one end of the bifurcated portion whereby when the strip is in place upon the chest the auxiliary measuring tape may be stretched over the nipples of the breasts to the other end of said bifurcated portion to measure the distance from one end to the other of said bifurcated portion around the outside of the intervening protuberance of the bust.

4. A bust measuring device according to claim 1 wherein said straps are parallel, and said parallel straps being adjustable as to length, and one portion of said interrupted tape measure being provided with a plurality of series of markings, said series being staggered with respect each to the other, whereby a correct reading of the girth of the chest may be had from one or another of said series in accordance with the adjustment of said parallel straps.

5. A bust parallel device comprising two measuring straps and a pair of yokes connecting their ends and constituting a frame said straps being adjustable step by step as to length, and said frame being adapted to surround the bust and to lie against the surface of the chest proper and an interrupted tape measure having portions secured on both sides of said frame; whereby the girth of the chest exclusive of the protuberance of the breasts may be measured; and an auxiliary measuring tape attached to one of said yokes whereby the distance from said yoke to the other yoke may be measured over the breasts at the level of the nipples to derive an index of the amount of said protuberance; one of the portions of said interrupted tape measure and the auxiliary measuring tape being provided with a plurality of scales, one scale of each relating to a particular adjustment of said parallel straps, and the other scales relating to other given adjustments of said parallel straps.

6. A bust measuring device comprising a pair of yokes and a pair of substantially parallel straps of equal length connected together at their ends by said yokes, said straps and said yokes forming a frame adapted to be placed against the surface of the chest surrounding the bust; an interrupted tape measure having one part attached to one of said yokes, and another part thereof attached to the other of said yokes; and an auxiliary measuring tape also attached to one of said yokes; whereby said two parts of said interrupted tape measure may be carried around the thorax to measure the girth of the chest exclusive of the protuberance of the breasts, and whereby said auxiliary measuring tape may be carried across the breasts at the level of the nipples thereof to measure the distance between the yokes when the same are positioned to the right and to the left of the bust.

7. A bust measuring device comprising a chest girth measuring part and a bust protrusion measuring part, said chest girth measuring part comprising a portion adapted to by-pass the bust without passing over the bust and another portion connected at one end to the first mentioned portion and adapted to be passed around the thorax to measure the girth of the chest exclusive of the protuberance of the breast.

8. A device to measure the girth of the chest exclusive of the protuberance of the breast, comprising a bifurcated frame, and an interrupted tape measure, said bifurcated frame having a portion adapted to pass above the breasts of the person being measured and a portion adapted to pass beneath the breasts of the person being measured, said interrupted tape measure having portions secured to both sides of the frame and calibrated to include the length of the frame from one side of the breasts to the other side of the breasts.

9. A device to measure the girth of the chest exclusive of the protuberance of the breast and to provide an indicia of breast protuberance comprising a bifurcated frame, and an interrupted tape measure, said bifurcated frame having a portion adapted to pass above the breasts of the person being measured and a portion adapted to pass beneath the breasts of the person being measured, said interrupted tape measure having portions secured to both sides of the frame and calibrated to include the length of the frame from one side of the breasts to the other side of the breasts, and an auxiliary tape measure secured at one end to one side of the frame and having a free end adapted to be passed across the breasts of the person being measured.

10. A device as claimed in claim 9 wherein said auxiliary tape measure is calibrated in units with the zero point being located on said auxiliary tape measure a distance from the point where said auxiliary tape measure is secured to the frame, equal to the width of the frame.

HARRY HEIMAN.

REFERENCES CITED

The following references are of record in the file of this patent:

UNITED STATES PATENTS

| Number | Name | Date |
| --- | --- | --- |
| 545,139 | Start | Aug. 27, 1895 |
| 633,654 | Melick | Sept. 26, 1899 |
| 902,704 | Anderson | Nov. 3, 1908 |
| 1,487,509 | Bushlowitz | Mar. 18, 1924 |
| 2,150,305 | Welch | Mar. 14, 1939 |

FOREIGN PATENTS

| Number | Country | Date |
| --- | --- | --- |
| 453,394 | Great Britain | Sept. 10, 1936 |